United States Patent [19]

Iizuka

[11] Patent Number: 5,508,743
[45] Date of Patent: Apr. 16, 1996

[54] MOVING IMAGE SIGNAL CODING APPARATUS AND MOVING IMAGE SIGNAL CODING CONTROL METHOD

[75] Inventor: Yoshio Iizuka, Yokohama, Japan

[73] Assignee: Canon Kabushiki Kaisha, Tokyo, Japan

[21] Appl. No.: 984,961

[22] Filed: Dec. 3, 1992

[30] Foreign Application Priority Data

Dec. 6, 1991 [JP] Japan .................................. 3-322643

[51] Int. Cl.⁶ ..................................................... H04N 7/36
[52] U.S. Cl. ............................ 348/415; 348/19; 348/420
[58] Field of Search ............................. 348/19, 420, 415; H04N 7/137, 7/36

[56] References Cited

U.S. PATENT DOCUMENTS 4,935,953  6/1990  Appel ......................................... 348/19

5,036,391  7/1991  Auvray ..................................... 348/420

OTHER PUBLICATIONS

Takahiro Saito et al., "Introduction to Image Data Compression Techniques: (9) Still Picture Coding", The Journal of the Institute of Television Engineers of Japan, vol. 44, No. 2, pp. 153–163, Feb. 1990.

*Primary Examiner*—Howard W. Britton
*Attorney, Agent, or Firm*—Fitzpatrick, Cella, Harper & Scinto

[57] ABSTRACT

A moving image signal coding apparatus and moving image signal coding method dividing one frame of the moving image signal into a plurality of areas which may possibly overlap each other and refreshing the areas at different periods corresponding to an independent non-overlapped range at the circumferential portion of the frame and to an overlapped range at the central portion. Further, a specific area in the frame can be encoded by selectively using inter-frame prediction coding and intra-frame prediction coding.

10 Claims, 10 Drawing Sheets

FIG. 7
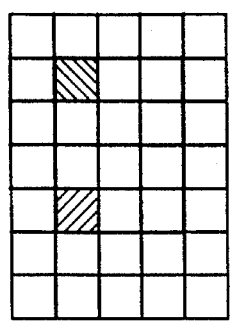
12TH FRAME
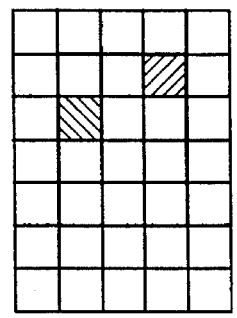
11TH FRAME
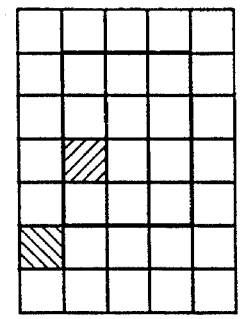
1ST FRAME
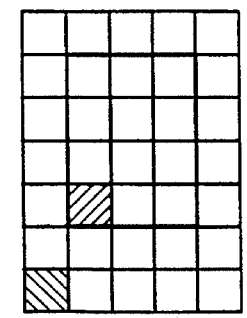
0TH FRAME
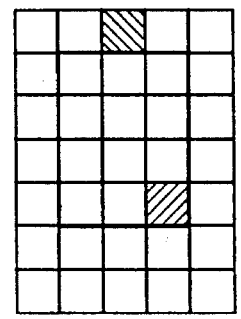
20TH FRAME
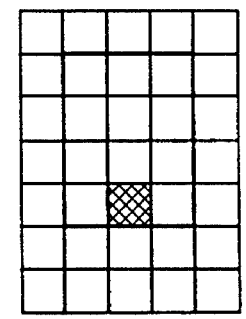
16TH FRAME
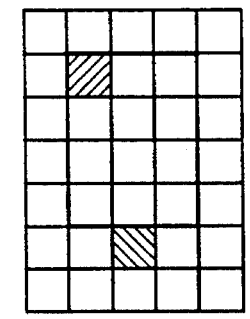
15TH FRAME

MOVING IMAGE SIGNAL CODING APPARATUS AND MOVING IMAGE SIGNAL CODING CONTROL METHOD

BACKGROUND OF THE INVENTION

The present invention relates to a moving image signal coding apparatus and a moving image signal coding control method for encoding moving image signals using inter-frame prediction and intra-frame prediction.

In moving image signal coding utilizing inter-frame prediction, coding without inter-frame prediction, i.e., refreshing, should be occasionally performed so that degradation of quality of a reproduced image due to accumulation of prediction errors can be kept equal to or lower than a predetermined level. Generally, in recent moving image signal coding methods, the refreshing is performed by block unit as shown in CCITT Recommendations H. 261. It should be noted, however, that the refreshing unit is not limited to this block unit.

A conventional refresh control method as an example for refreshing all the blocks within one frame at a fixed period is classified into:

(1) a method refreshing all the blocks within one frame in a frame timing; and (2) a method refreshing one or plural blocks in one frame timing and shifting the position of refreshing block in accordance with frame update.

Another example of the refresh control method is:

(3) a method dividing one frame into two areas or more and refreshing the respective areas at different periods corresponding to the respective areas.

In a prediction mode switchover control method for a moving image signal coding apparatus which encodes moving image signals using conventional inter-frame prediction and intra-frame prediction, correlation between a block to be encoded in a current frame and a block at a corresponding position in a previous frame is calculated, and the prediction mode is switched over in accordance with the obtained correlation amount. More specifically, if the correlation amount is equal to or more than a predetermined threshold value, the prediction mode is switched over to an inter-frame prediction mode, while the prediction mode is switched over to an intra-frame prediction mode if the correlation amount is less than the threshold value.

This calculation of the correlation between the blocks differs depending upon definition of the correlation. As an example, the correlation is obtained by calculating a difference between pixels of two blocks which are at corresponding positions and by calculating the reciprocal of the distribution of the calculated difference value.

Generally, coding amount increases if refreshing is performed upon encoding of a moving image signal. For example, in the aforementioned method (1), the coding amount within a frame being refreshed suddenly increases, disturbing moving image communication at a constant frame rate.

In the methods (1) and (2), as the refreshing is performed at all the positions within one frame at one period, the refreshing in a position of higher-interest which attracts a viewer's attention, such as a central portion of the frame, and the refreshing in a position of lower-interest, such as a circumferential portion of the frame, are performed in the same manner. A conceivable problem is that the refreshing in the lower-interest position is wasted because the improved image quality of the circumferential portion does not substantially influence the overall image quality.

In the method (3), the higher-interest area can be refreshed at a short period and the lower-interest area can be refreshed at a long period. Compared with the methods (1) and (2), the method (3) provides reproduced images of subjectively high quality. However, in this method, as the one frame is divided into two areas or more, and the refresh control is performed at different periods in the respective areas, the control method tends to be complicated.

FIGS. 2A and 2B illustrate the concept of the method (3). FIG. 2A shows an example where the frame is divided into two rectangular areas, assuming that the central portion of the frame is the higher-interest area. In this case, the circumferential area is doughnut-shaped, complicating the calculation of the block addresses included in this area.

In order to simplify the block address calculation, the circumferential area should be further divided into four areas (FIG. 2B I-1 to I-4). In this case, though each address calculation can be simplified, the number of areas which was initially two has increased into five. At last, the refresh control becomes complicated as a whole.

Further, in the aforementioned conventional prediction mode switchover control method, the prediction mode is changed over for all the blocks in the respective frames under the same condition. This type of coding control method which does not depend upon frame or block position has high versatility; however, it cannot be an appropriate control method for a specific practical application. For example, in visual telephones, generally communication is performed between two persons. A person at one end watches the face of another person at the other end displayed at the central portion of the screen, and seldom pays attention to the circumferential portion of the screen image.

The transmission speed of communication lines used in the visual telephones is usually 64 Kbps–128 Kbps, which is not sufficient to obtain high image quality throughout the whole frame. If the entire frame is encoded under the same condition in such lower-bit rate transmission, the image quality of the whole reproduced image is degraded. Especially, image quality immediately after starting of communication or image quality in several frames immediately after a scene change operation are degraded because the correlation between the frames becomes extremely small after such operations. For this reason, in the conventional prediction mode switchover control method, the prediction mode is set to intra-frame prediction mode in almost all the blocks within the frames.

However, coding amount tends to increase more in the intra-frame prediction mode, as, compared with the amount in an inter-frame prediction mode. In the CCITT Recommendations H. 261 as a standard moving image signal coding method for teleconference systems/visual telephones, the coding amount within one block can be reduced to almost zero in the inter-frame prediction mode. However, in the intra-frame prediction mode, there is the lower limit of coding amount which is necessary in one block, and for this reason, if the intra-frame prediction mode is successively selected, the coding amount exceeds the communication capacity.

In order to avoid such problem, in the Recommendation H. 261, it is arranged that output from an encoder is temporarily stored into a transmission buffer, and the coding is controlled so that the transmission buffer is not allowed to overflow. For this reason, in a frame immediately after a scene change operation, the intra-frame prediction mode is successively selected; however, at a point in time where the transmission buffer comes to overflown, the inter-frame prediction mode is selected to forcibly keep prediction errors between the frames zero and prevent generation of coded data.

This forcible selection of the inter-frame prediction mode continues till the amount of the coded data in the transmission buffer becomes equal to or lower than a predetermined level. As a result, when the scene change operation is performed at the lower-bit rate coding, many blocks exist where images before the scene change remain as they are over several frames right after the scene change operation. Further, these blocks are at irregular positions, thus lowering the quality of a reproduced image.

SUMMARY OF THE INVENTION

The present invention has been made in consideration of the above situation, and has as its object to provide a moving image signal coding apparatus and a moving image signal coding method for setting a refreshing period to an arbitrary length in accordance with a position of a portion to be refreshed in the frame without complicating the refresh control, improving the image quality within the higher-interest range, and quickening the restoration in the case of transmission error.

Another object of the present invention is to provide a moving image signal coding apparatus and a moving image signal coding method for preventing degradation of image quality in the higher-interest area on a screen immediately after starting of communication or a scene change operation.

In order to attain the foregoing objects, the present invention provides a moving image signal coding apparatus which encodes a moving image signal by inter-frame prediction coding and refreshing without inter-frame prediction, comprising division means for dividing one frame of the moving image signal into a plurality of areas possible to overlap each other and means for performing refreshing in the areas at different periods corresponding to an independent non-overlapped range and an overlapped range.

Further, the present invention provides a moving image signal coding apparatus which encodes a moving image signal, switching over between inter-frame prediction coding and intra-frame prediction coding selectively, comprising specification means for specifying an area in a frame of the moving image signal as an object of coding and coding control means for controlling the coding so that the moving image signal is encoded by inter-frame prediction coding in the specified area.

Further, the present invention provides a moving image signal coding apparatus which encodes a moving image signal, switching over between inter-frame prediction coding and intra-frame prediction coding selectively, comprising specification means for specifying an area in a frame of the moving image signal as an object of coding and coding control means for controlling the coding so that the moving image signal is encoded by the intra-frame prediction coding in the specified area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram for explaining the refreshing in the first embodiment;

DETAILED DESCRIPTION OF THE PREFERRED EMBODIMENTS

The preferred embodiments of the present invention will be described in detail in accordance with the accompanying drawings.

[First Embodiment]

Figure 1:
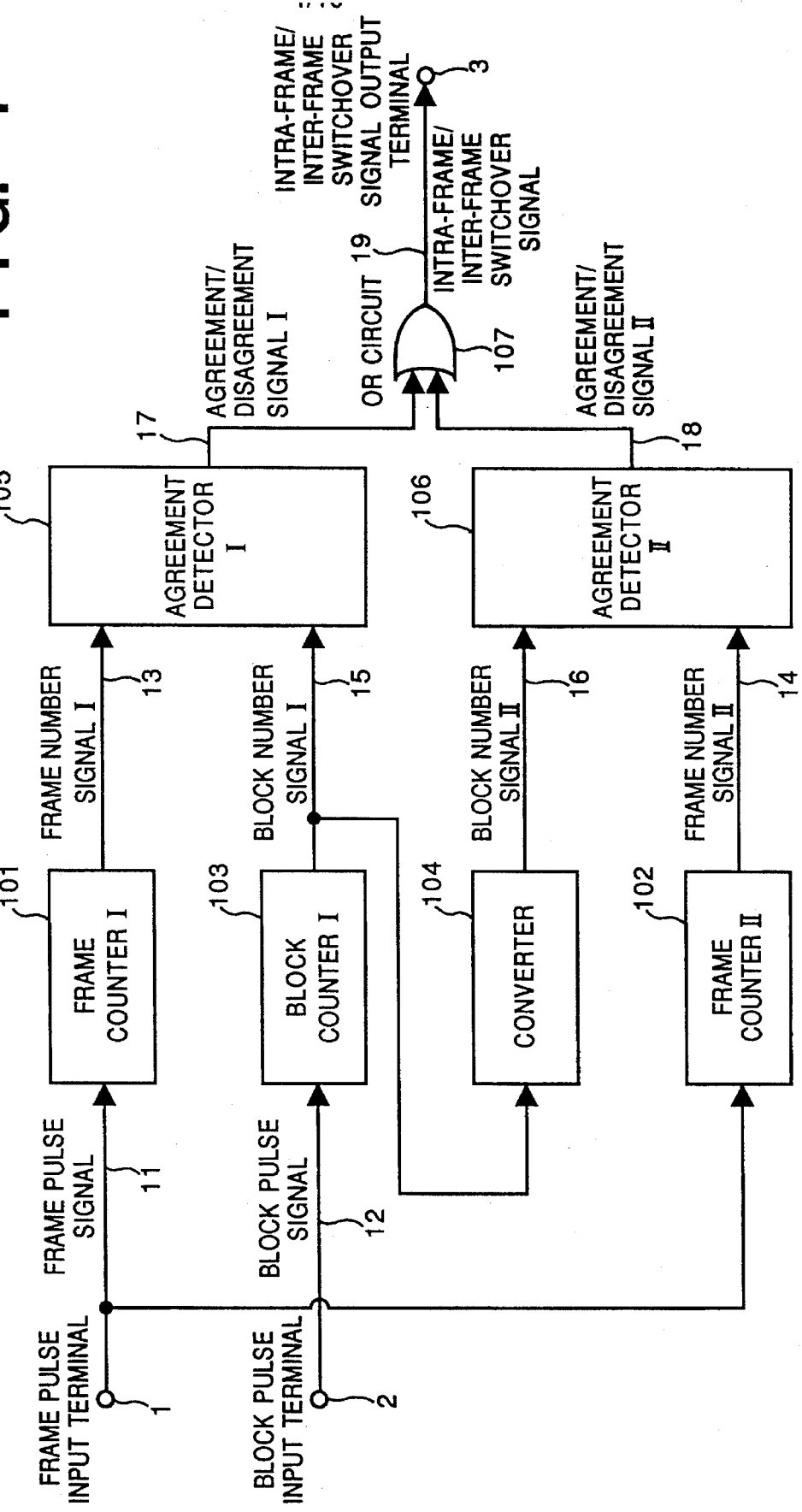
FIG. 1 is a block diagram showing a construction of an intra-frame/inter-frame switchover signal output circuit employed in a moving image signal coding apparatus according to a first embodiment of the present invention.

FIG. 1 is a block diagram showing a construction of an intra-frame/inter-frame switchover signal output circuit employed in a moving image signal coding apparatus utilizing intra-frame prediction and inter-frame prediction according to a first embodiment of the present invention. In FIG. 1, a frame pulse signal 11 inputted from a frame pulse input terminal 1 enters a frame counter I 101 and a frame counter II 102. The frame counter I 101 outputs a frame number signal I 13 into an agreement detector I 105.

A block pulse signal 12 inputted from a block pulse signal input terminal 2 is inputted into a block counter I 103, which outputs a block number signal I 15 into the agreement detector I 105 and a converter 104. The agreement detector I 105 outputs an agreement/disagreement signal I 17 into an OR circuit 107. The frame counter II 102 outputs a frame number signal II 14 into an agreement detector II 106.

The converter 104 outputs a block number signal II 16 into the agreement detector II 106. The agreement detector II 106 outputs an agreement/disagreement signal II 18 into the OR circuit 107. The OR circuit 107 outputs an intra-frame/inter-frame switchover signal 19 to be outputted from an intra-frame/inter-frame switchover signal output terminal 3. A block processed when this output is an "intra-frame switchover signal" is a so-called block to be refreshed which will be encoded without utilizing inter-frame prediction upon encoding of a moving image signal using the inter-frame prediction.

Figure 3:
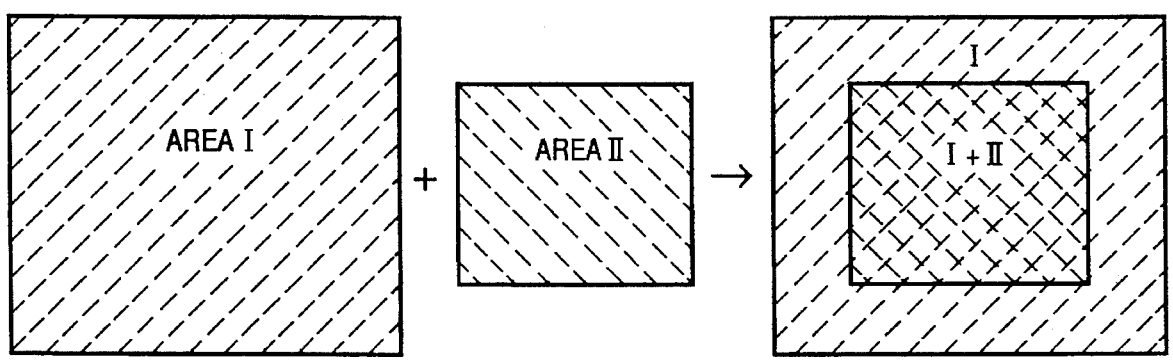
FIG. 3 is a diagram showing as an example a concept of determining areas in order to realize refreshings at different periods corresponding to a central portion and a circumferential portion of a frame in the first embodiment.

FIG. 3 illustrates as an example a concept of determining areas in order to realize refreshing at different periods in a central portion and a circumferential portion of a frame.

Figure 2A:
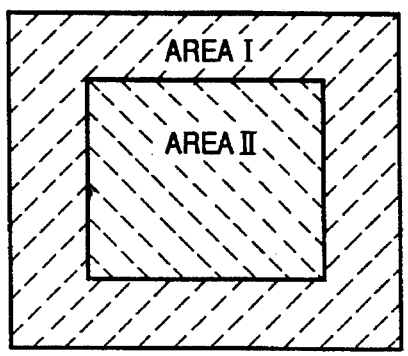
FIGS. 2A and 2B are diagrams showing a conventional refresh control method.
Figure 2B:
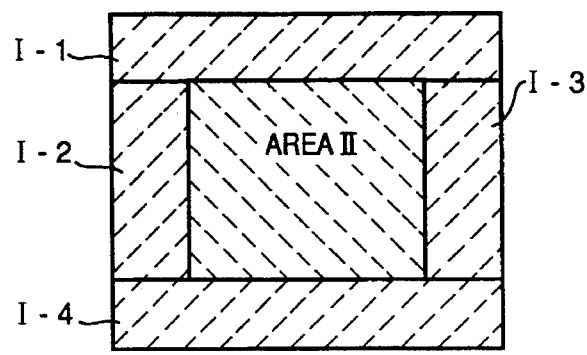

As it is apparent from comparison with FIGS. 2A and 2B, which illustrate a concept of the conventional method, in FIG. 3, the central portion of the frame is included in an area I and also included in an area II. Thus both areas can be rectangular by overlapping with each other, and thus address calculations of respective blocks included in the areas can be simplified.

Figure 4:
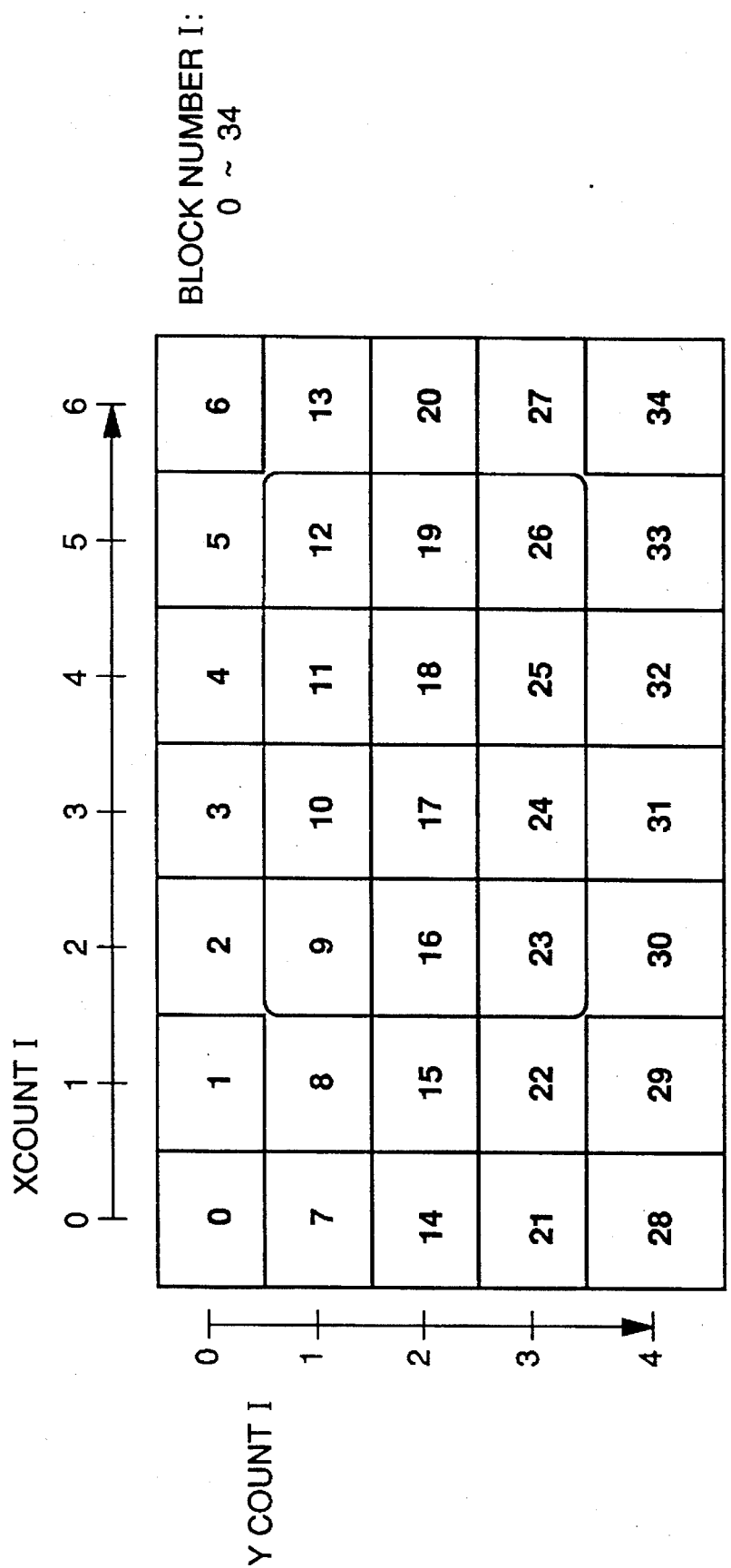
FIGS. 4 and 5 are diagram showing a frame structure of FIG. 3.
Figure 5:
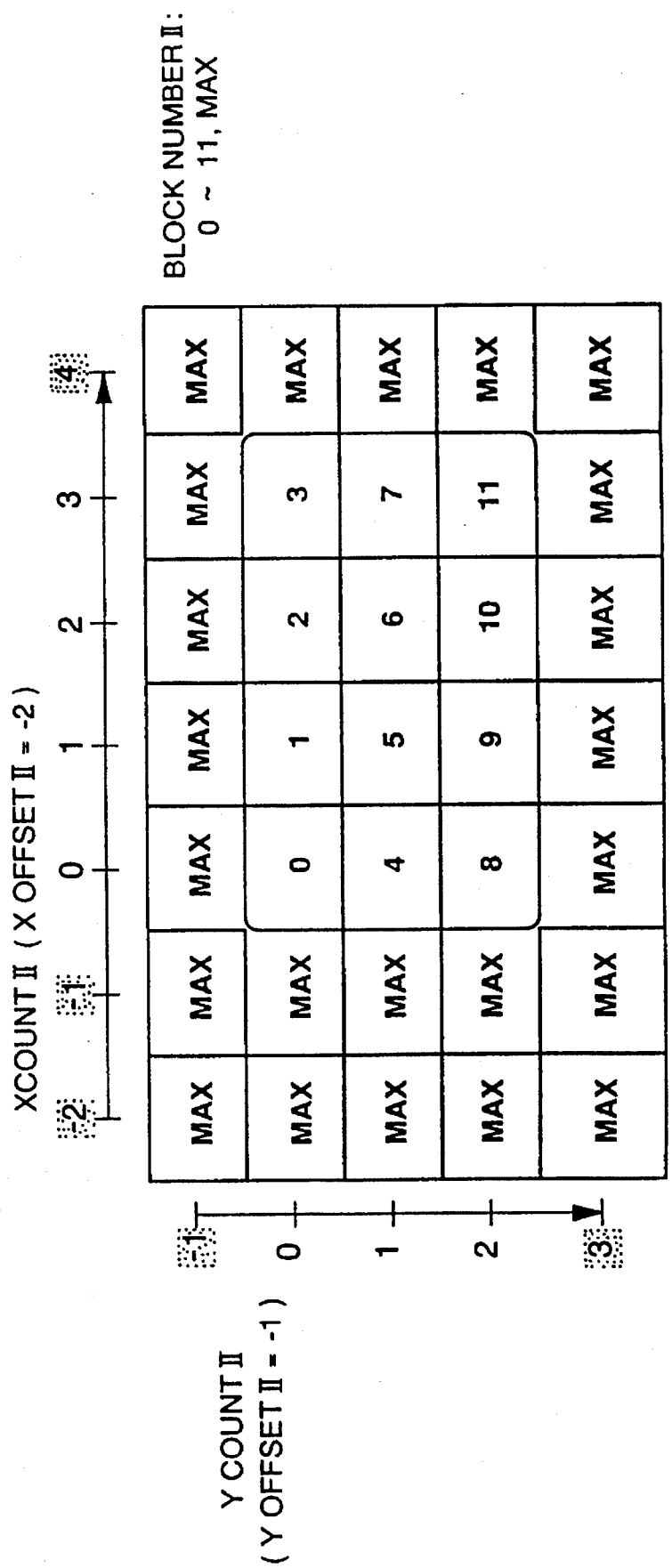

FIGS. 4 and 5 respectively illustrate the frame structure in the concept of FIG. 3.

A frame shown in FIG. 4 corresponds to the area I in FIG. 3, and an area including numbered cells corresponds to the area II in FIG. 3. It should be noted that in this embodiment, the total number of blocks included in one frame is 35 in an arrangement with seven in a horizontal direction and five in a vertical direction as shown in FIGS. 4 and 5; however, these numbers are merely examples.

In FIGS. 4 and 5, numerals of the respective blocks indicate block numbers within the areas. X count and Y count are respectively change amounts of the number of blocks in X direction and Y direction having a 0th block as a starting point. Note that in FIG. 5, an effective range of the X count is 0 to 3 and that of the Y count is 0 to 2.

Also, the X offset and Y offset in FIG. 5 are respectively change-amounts of the number of blocks in X direction and Y direction necessary to make the 0th block in FIG. 5 correspond with the 0th block in FIG. 4. Further, "MAX" in FIG. 5 indicates a block without the effective range. Upon calculation, a maximum value which the calculation device can deal with is set as the "MAX" value. Note that this MAX value should be larger than the maximum value of block number I, i.e., 34 in FIG. 4.

Next, operation of the intra-frame/inter-frame switchover signal output circuit according to the present invention will be described below.

In FIG. 1, the frame pulse signal 11 inputted from the frame pulse input terminal 1 enters into the frame counter I 101 and the frame counter II 102, which counts up by one at every pulse input of the frame pulse signal 11. The frame counter I 101 counts within a 0–34 range. When the count value becomes 34, the count value is cleared to zero by the next count-up. The frame counter II 102 counts within a 0–11 range. After the count value becomes 11, it is cleared to zero.

On the other hand, the block pulse signal 12 inputted from the block pulse input terminal 2 enters the block counter I 103 which counts up by one at every pulse input of the block pulse signal 12. This block counter I 103 counts within a 0–34 range. When the count value becomes 34, the count value is cleared to zero by the next count-up. The frame number signal I 13 outputted from the frame counter I 101 and the block number signal I 15 outputted from the block counter I 103 enter the agreement detector I 105, which compares these signals and outputs the agreement/disagreement signal I 17 into the OR circuit 107 based on the comparison results.

The block number signal I 15 outputted from the block counter I 103 enters the converter 104, which converts the block number signal and outputs the block number signal II 16 in accordance with the following conversion expressions:

X count II=block number I% number of effective blocks I in X direction+X offset II (1)

Y count II=block number I/number of effective blocks I in X direction+Y offset II (2)

block number II=X count II+Y count II * number of effective blocks II in X direction (3)

It should be noted that all the above expressions are for integer calculations, and in the expressions, "/" indicates a division omitting decimals and "%" indicates a division obtaining residues.

If the calculation results of X count II and Y count II assume a value without the effective ranges, the value is replaced by a MAX value. As a result, if the block number II overflowns, again, the value is replaced by a MAX value.

Note that in FIG. 4, the number of effective blocks I in X direction=7 and in FIG. 5, the number of effective blocks II in X direction=4

X offset II=−2

Y offset II=−1

The frame number signal II 14 outputted from the frame counter II 102 and the block number signal II 16 outputted from the converter 104 enter the agreement detector II 106 which compares the signals and outputs the agreement/disagreement signal II 18 based upon the comparison result into the OR circuit 107.

Figure 6:
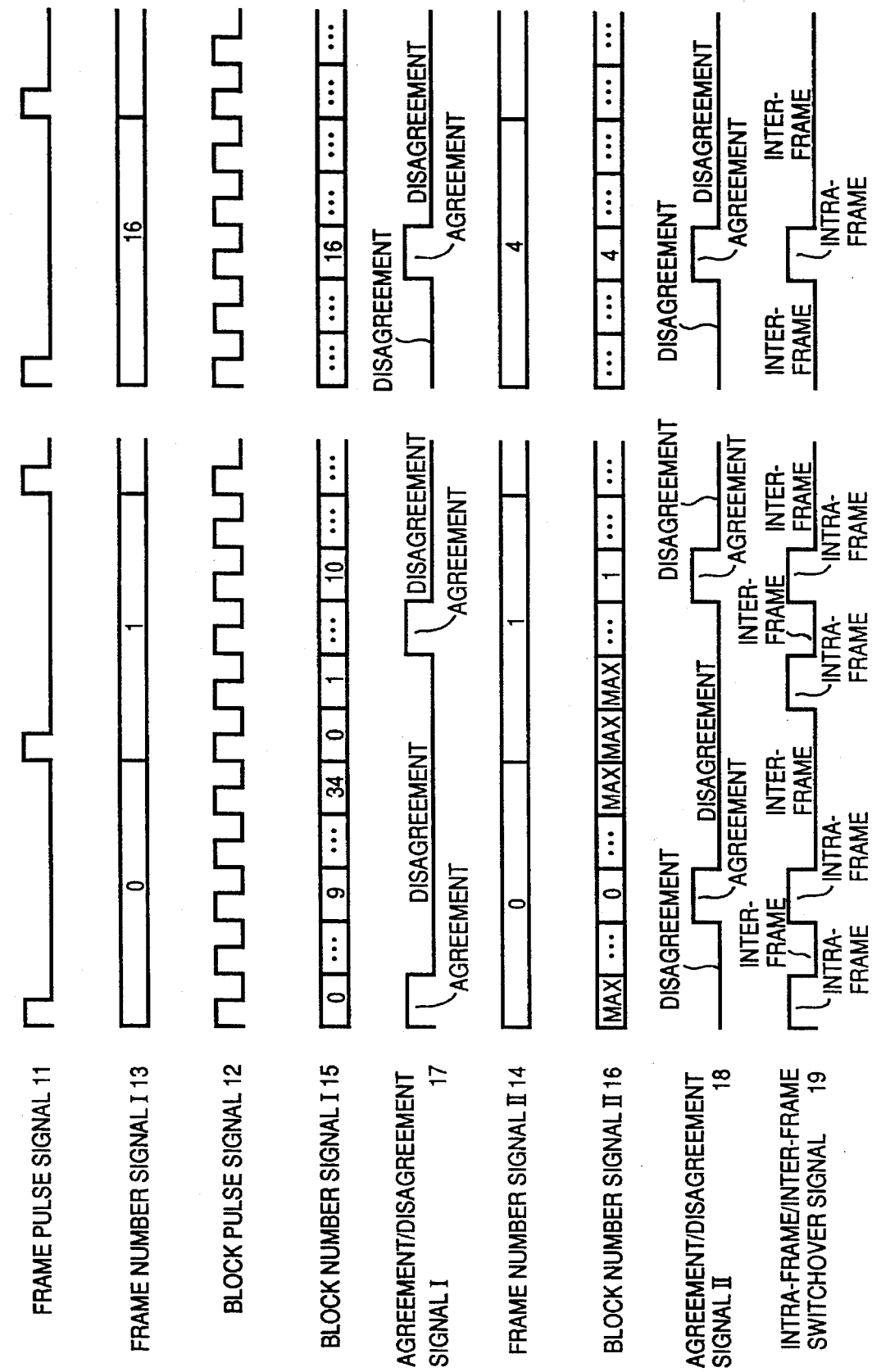
FIG. 6 is a timing chart showing operation of the intra-frame/inter-frame switchover signal output circuit according to the first embodiment.

The OR circuit 107 outputs an "intra-frame switchover signal" if the input agreement/disagreement signal I 17 or the agreement/disagreement signal II 18 is an "agreement switchover signal", while the OR circuit 107 outputs an "inter-frame switchover signal" if the both agreement/disagreement signals are "disagreement switchover signals". Accordingly, a block when the intra-frame/inter-frame switchover signal 19 outputted from the OR circuit 107 is an "intra-frame switchover signal", is a block to be refreshed FIG. 6 is a timing chart showing operation of the intra-frame/inter-frame switchover signal output circuit. FIG. 7 is a diagram explaining the refreshing operation.

As shown in FIG. 6, the number of refresh blocks is normally one or two within one frame upon assumption that one frame consists of two areas. However, as shown in a 16th frame of FIG. 7, if the positions of refresh blocks in the respective areas coincide, the number of refresh blocks is less than the number of the areas.

As the refresh blocks shift their positions within the respective areas at a constant period, the smaller one area becomes, the shorter the refreshing period becomes. Further, within an overlapped range, refreshings of two types of periods are performed, the blocks are refreshed more frequently.

In this manner, the structure of one frame of a moving image signal is regarded as a combination of a plurality of areas possible to be overlapped. By this arrangement, the refresh control in moving image signal coding is kept simple. Further, in this refresh control, the refresh period in a higher-interest range such as the central portion of the frame can be shortened and that in a lower-interest range such as the circumferential portion of the frame can be prolonged so that image quality within the higher-interest range can be improved, and in case of error, restoration can be quickened.

[Second Embodiment]

Next, a second embodiment according to the present invention will be described below.

Figure 8:
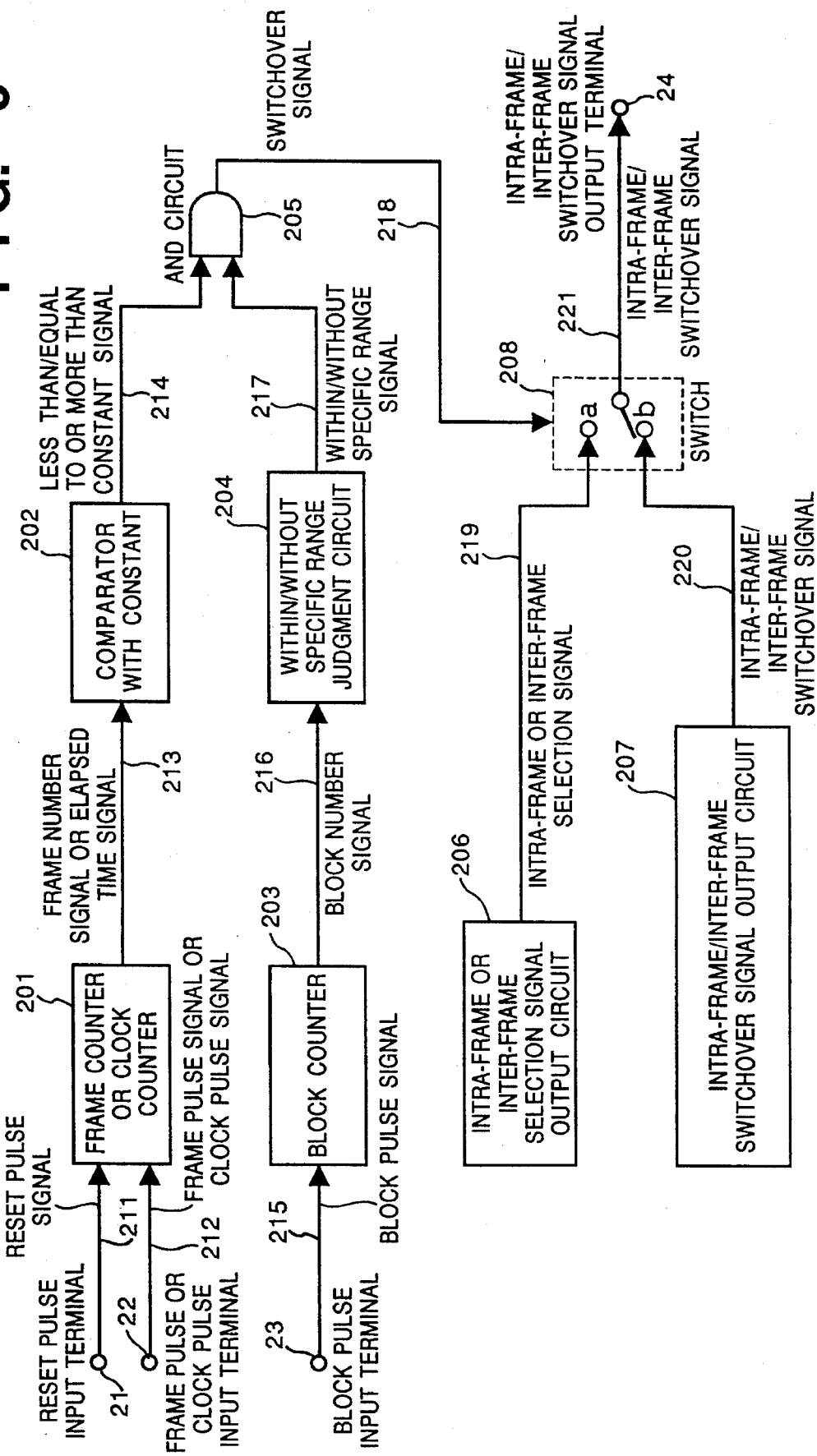
FIG. 8 is a block diagram showing a construction of an intra-frame/inter-frame switchover signal output circuit employed in a moving image signal coding apparatus according to a second embodiment of the present invention.

FIG. 8 is a block diagram showing a construction of an intra-frame/inter-frame switchover signal output circuit employed in a moving image signal coding apparatus utilizing inter-frame prediction and intra-frame prediction according to a second embodiment of the present invention.

In FIG. 8, components of the apparatus referred to with "or" have two functions and either one of the functions becomes active corresponding to the respective aspects of the invention as recited in the claims.

More specifically, in accordance with the respective aspects of the invention, a frame pulse or clock pulse input terminal 22 functions as a frame pulse input terminal, otherwise, as a clock pulse input terminal; a frame counter or clock counter 201, as a frame counter, otherwise, as a clock counter, further, a frame number signal or elapsed time signal 213 is outputted as a frame number signal, otherwise, as an elapsed time signal.

Similarly, an intra-frame or inter-frame selection signal output circuit 206 functions as an intra-frame selection signal output circuit, otherwise, as an inter-frame selection signal output circuit; an intra-frame or inter-frame selection signal becomes an intra-frame selection signal, otherwise, an inter-frame selection signal.

In FIG. 8, a reset pulse signal 211 inputted from a reset pulse input terminal 21 enters the frame counter or clock counter 201. Also, a frame pulse signal or clock pulse signal 212 inputted from the frame pulse or clock pulse input terminal 22 enters the frame counter or clock counter 201. Then, frame counter or clock counter 201 outputs the frame number signal or elapsed time signal 213 into a comparator with constant 202.

The comparator with constant 202 outputs a signal 214 indicative of less than/equal to or more than the constant into an AND circuit 205. Further, a block pulse signal 215 inputted from a block pulse input terminal 23 enters a block counter 203, which outputs a block number signal 216 into a within/without specific range judgment circuit 204. The within/without specific range judgment circuit 204 outputs a within/without specific range signal 217 into the AND circuit 205.

The intra-frame or inter-frame selection signal 219 outputted from the intra-frame or inter-frame selection signal output circuit 206 enters a switch 208. Also, An intra-frame/inter-frame switchover signal 220 outputted from an intra-frame/inter-frame switchover signal output circuit 207 enters the switch 208. If a switchover signal 218 outputted from the AND circuit 205 is "OFF", the switch 208 is connected to the intra-frame/inter-frame switchover signal output circuit 207, i.e., to the position "b" in FIG. 8, while the switch 208 is connected to the intra-frame or inter-frame selection signal output circuit 206, i.e., to the position "a" if the switchover signal 218 is "ON". The switch 208 outputs an intra-frame/inter-frame switchover signal 221 to be outputted from an intra-frame/inter-frame switchover signal output terminal 24.

Figure 9:
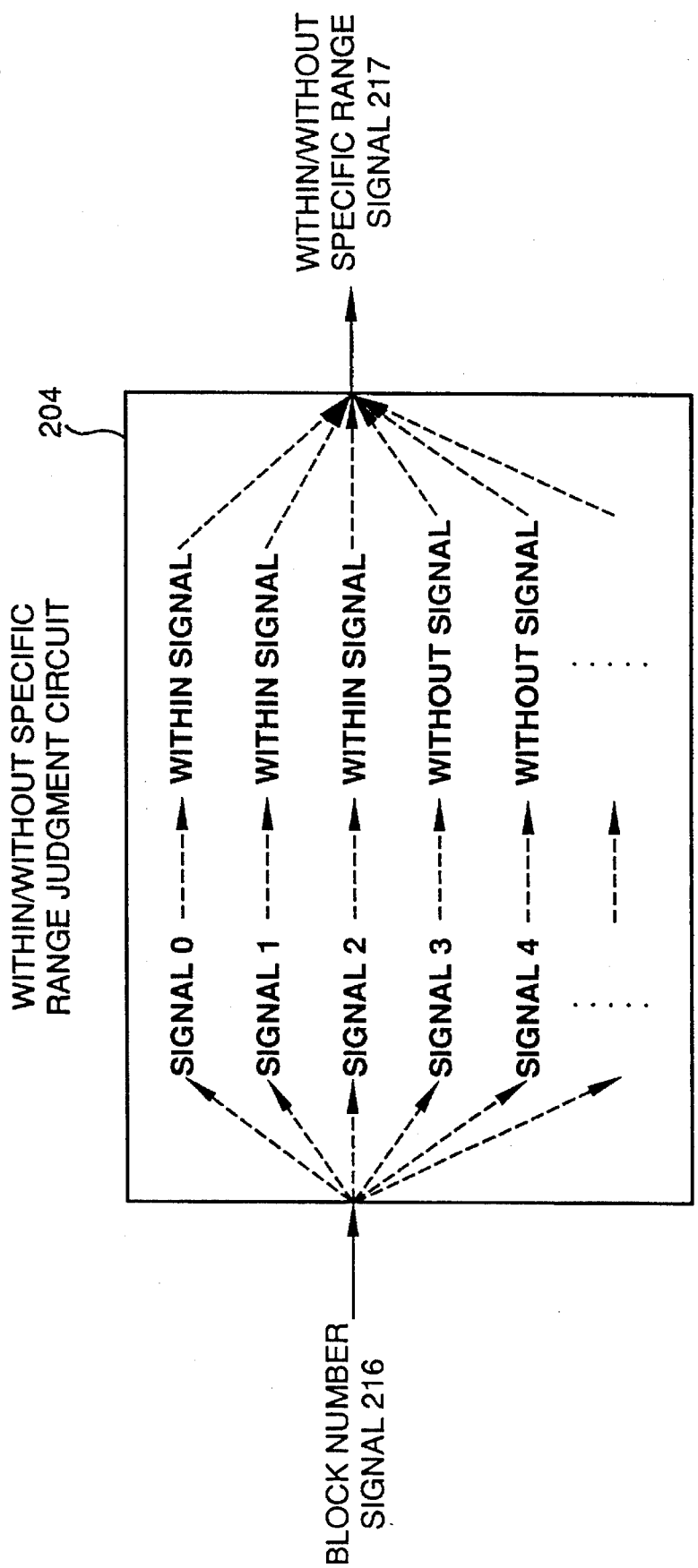
FIG. 9 is a block diagram showing a construction of a within/without specific range judgment circuit according to the second embodiment.

FIG. 9 is a block diagram showing a construction of the within/without specific range judgment circuit 204. When the block number signal 216 enters, the within/without specific range judgment circuit 204 outputs the within/without specific range signal 217 using a look-up table (not shown). This look-up table provides the most simple and flexible judgment method; however, in a case where the relationship between the block number signal 216 and the within/without specific range signal 217 can be described by an equation, a judgment result can be obtained by calculation based on the equation.

Next, operation of the intra-frame/inter-frame switchover signal output circuit of the moving image signal coding apparatus according to this embodiment will be described below.

Figure 10:
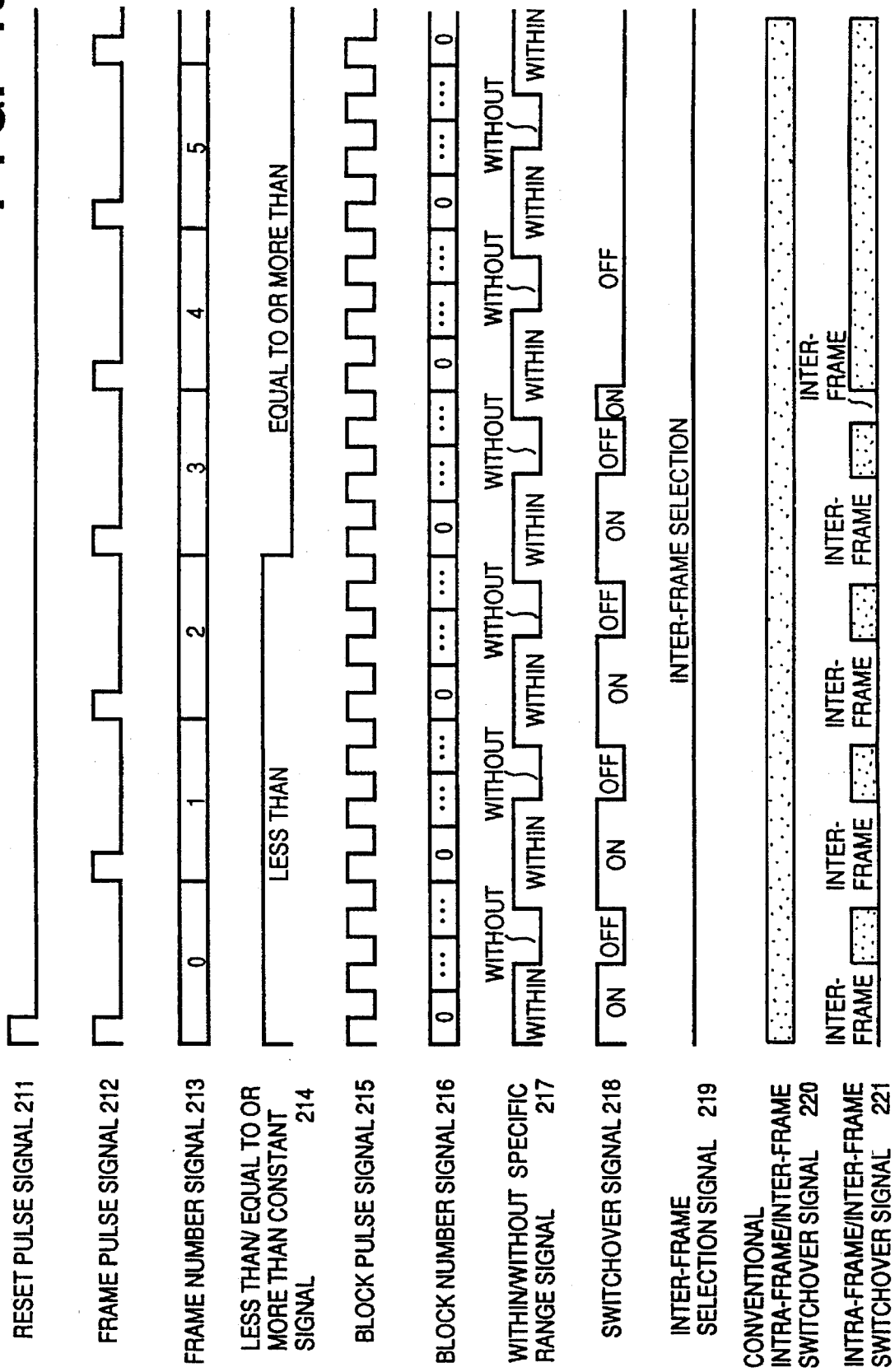
FIG. 10 is a timing chart showing operation of the intra-frame/inter-frame switchover signal output circuit according to the second embodiment.

FIG. 10 is a timing chart showing operation of the intra-frame/inter-frame switchover signal output circuit. In FIG. 10, when the reset pulse signal 211 inputted from the reset pulse input terminal 21 enters the frame counter or clock counter 201 which, e.g., functions as a frame counter, the frame counter 201 resets the count value to zero. Thereafter, the frame counter 201 counts up by one at every pulse input of the frame pulse signal 212 from the frame pulse input terminal 22. Numerical values that the frame counter 201 can deal with are larger than those the block counter 203 can deal with. In the case of a overflow status as a result of count-up, the maximum value is set to the frame counter 201 all the time.

The frame number signal 213 outputted from the frame counter 201 enters the comparator with constant 202, which compares the frame number signal 213 and a predetermined constant, and outputs a comparison result as the less than/equal to or more than constant signal 214. If the comparison result is less than the constant, the signal 214 becomes active.

On the other hand, the block pulse signal 215 inputted from the block pulse input terminal 23 enters the block counter 203, which counts up by one at every pulse input of the block pulse signal 215. The block counter 203 counts up till the count value becomes its maximum value, and then the value is cleared to zero by the next count-up.

The block number signal 216 outputted from the block counter 203 enters the within/without specific range judgment circuit 204, which judges whether the signal is included within a predetermined range and outputs a judgment result as the within/without specific range signal 217. If the judgment result is within the specific range, the within/without specific range signal 217 becomes active.

When the less than/equal to or more than constant signal 214 and the within/without specific range signal 217 enter the AND circuit 205, the circuit 205 outputs the switchover signal 218. If the less than/equal to or more than constant signal 214 and the within/without specific range signal 217 are both active, the switchover signal 218 becomes a signal to turn the switch 208 to "ON".

The switch 208 is thus controlled by the switchover signal 218. If the switchover signal 218 is "ON", the inter-frame selection signal 219 outputted from the inter-frame selection signal output circuit 206 becomes as an output of the switch 208, and the intra-frame/inter-frame switchover signal 221 becomes a signal to select only the inter-frame prediction. On the other hand, if the switchover signal 218 is "OFF", the output of the switch 208 is the conventional intra-frame/inter-frame switchover signal 220 from the intra-frame/inter-frame switchover output circuit 207, and the intra-frame/inter-frame switchover signal 220 becomes the intra-frame/inter-frame switchover signal 221.

In this manner, the condition for selecting between the inter-frame and intra-frame prediction modes is limited within a specific range. Otherwise, the selection condition is limited within a specific range for a fixed period of time after instruction or within a fixed number of frames. By this arrangement, in a lower-bit rate coding, forcible selection of the inter-frame prediction mode at irregular positions, in consequence of an overflow elimination of transmission buffer, can be avoided immediately after starting of the communication or immediately after a scene change operation.

Further, if it is arranged that only the inter-frame prediction mode can be selected in a lower-interest area such as a circumferential portion of a frame, forcible selection of the inter-frame prediction mode against overflow status of the transmission buffer in a higher-interest area such as a central portion of the frame can be avoided. Thus, quality of a reproduced image can be improved by this arrangement.

If a frame includes an area which especially attracts attention, only the intra-frame prediction mode can be selected within the area so that an image without error accumulation due to frame update can be obtained.

In this embodiment, the switchover signal 218 becomes a signal to turn the switch 208 to "ON" by taking logical sum of the less than/equal to or more than constant signal 214 and the within/without specific range signal 217 if both signals are active. However, as shown in FIG. 11, the within/without specific range signal 217 can be employed as a switchover signal to perform coding without execution instruction of frame prediction.

Figure 11:
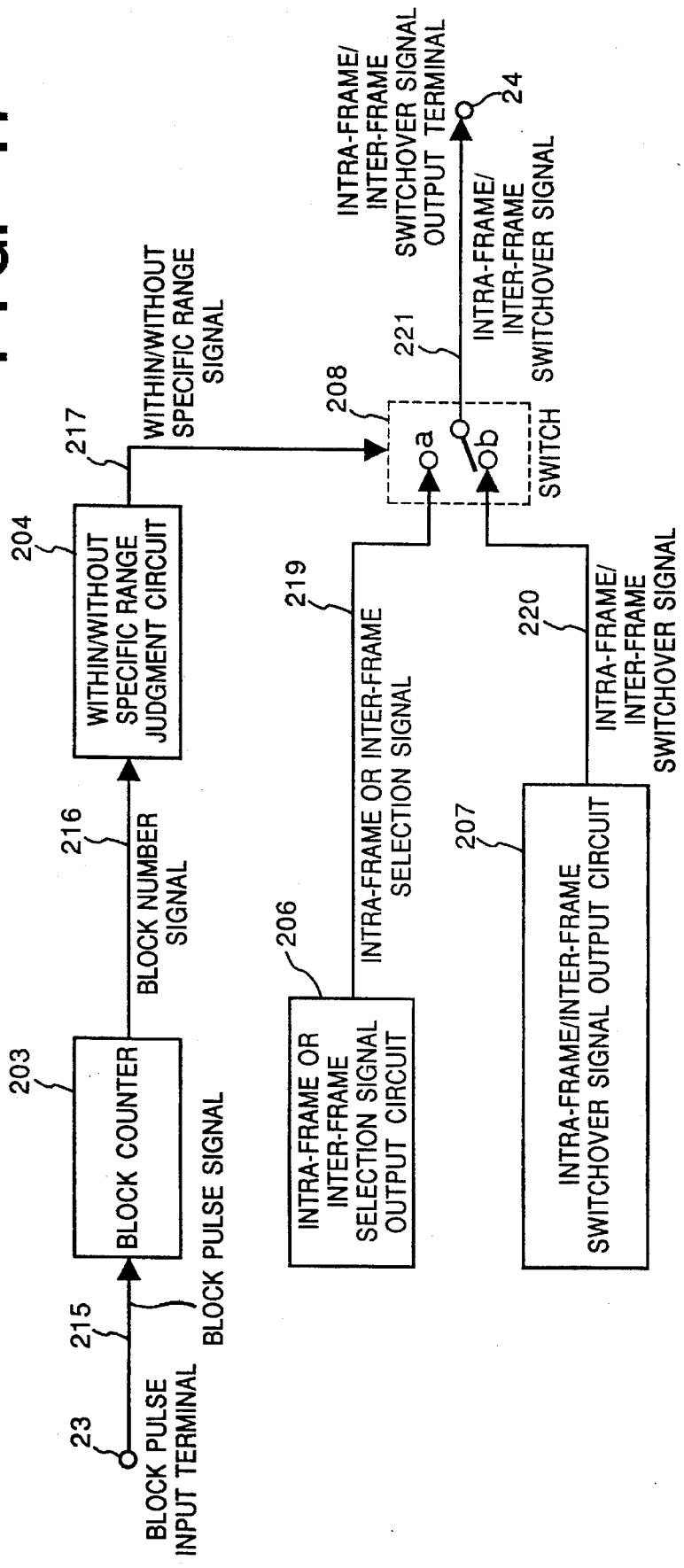
FIG. 11 is a block diagram showing a construction of an intra-frame/inter-frame switchover signal output circuit according to a modification to the second embodiment.

It should be noted that components of an apparatus as shown in FIG. 11 with reference numerals including "or" have similar functions to those of the components in FIG. 8.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A moving image signal coding apparatus which encodes a moving image signal by inter-frame prediction coding and refreshing without inter-frame prediction, comprising:

division means for dividing one frame of the moving image signal into a plurality of areas possible to overlap with each other; and means for performing refreshing in the areas at different periods corresponding to an independent non-overlapped range and an overlapped range.

2. The apparatus according to claim 1, wherein the independent non-overlapped range and the overlapped range are both rectangular, and wherein the independent range is positioned at the circumferential portion of the frame, and the overlapped range is positioned at the central portion of the frame.

3. The apparatus according to claim 1, wherein the refreshing is applied to the overlapped range more frequently than to the independent range.

4. The apparatus according to claim 1, wherein the independent range and the overlapped range are further divided into a plurality of blocks, and wherein the refreshing is performed by block unit.

5. The apparatus according to claim 4, wherein the number of the blocks to be refreshed is equal to or less than the number of the plurality of areas divided by said division means.

6. A moving image signal coding control method for encoding a moving image signal by inter-frame prediction coding and refreshing without inter-frame prediction, comprising:

a step of dividing one frame of the moving image signal into a plurality of areas possible to overlap each other; and a step of performing refreshing in the areas at different periods corresponding to an independent range and an overlapped range.

7. The method according to claim 6, wherein the independent non-overlapped range and the overlapped range are both rectangular, and wherein the independent range is positioned at the circumferential portion of the frame, and the overlapped region is positioned at the central portion of the frame.

8. The method according to claim 6, wherein the refreshing is applied to the overlapped range more frequently than to the independent range.

9. The method according to claim 6, wherein the independent range and the overlapped range are further divided into a plurality of blocks, and wherein the refreshing is performed by block unit.

10. The method according to claim 9, wherein the number of blocks to be refreshed is equal to or less than the number of the plurality of areas produced by said dividing step.

* * * * *

UNITED STATES PATENT AND TRADEMARK OFFICE
CERTIFICATE OF CORRECTION

| | | |
|---|---|---|
| PATENT NO. : | 5,508,743 | Page 1 of 2 |
| DATED : | April 16, 1996 | |
| INVENTOR(S) : | YOSHIO IIZUKA | |

It is certified that error appears in the above-indentified patent and that said Letters Patent is hereby corrected as shown below:

ON THE COVER PAGE

[56] References Cited

OTHER PUBLICATIONS

"pp 153-163" should read --pp 153-161--.

COLUMN 1

Line 28, "of" should read --of the--; and "block in" should read --block (the block being refreshed at a given time) in--.

COLUMN 2

Line 50, "as," should read --as--.

COLUMN 3

Line 1, "overflown," should read --overflow,--.

COLUMN 4

Line 13, "diagram" should read --diagrams--.

COLUMN 6

Line 1, "1%" should read --I%--.
Line 15, "overflowns" should read --overflows--.

UNITED STATES PATENT AND TRADEMARK OFFICE
CERTIFICATE OF CORRECTION

PATENT NO. : 5,508,743 Page 2 of 2
DATED : April 16, 1996
INVENTOR(S) : YOSHIO IIZUKA It is certified that error appears in the above-indentified patent and that said Letters Patent is hereby corrected as shown below:

<u>COLUMN 8</u>

Line 17, "a" should read --an--.

Signed and Sealed this

Third Day of September, 1996

Attest:

BRUCE LEHMAN

Attesting Officer     Commissioner of Patents and Trademarks